United States Patent [19]

Soundararajan

[11] Patent Number: 4,488,952
[45] Date of Patent: Dec. 18, 1984

[54] METHOD OF DESULPHURIZATION OF COAL

[75] Inventor: Rengarajan Soundararajan, Oregon County, Mo.

[73] Assignee: Research Manufacturing Consultation Corporation, Alton, Mo.

[21] Appl. No.: 562,153

[22] Filed: Dec. 16, 1983

[51] Int. Cl.³ .............................................. B01J 19/12
[52] U.S. Cl. ......................... 204/158 R; 204/158 HE; 204/162 R; 204/162 HE
[58] Field of Search ............... 204/158 HE, 157.1 H, 204/158 R, 158 L, 162 R, 162 HE, 157.1 R; 134/1

[56] References Cited

U.S. PATENT DOCUMENTS 4,177,120 12/1979 Zenty .............................. 204/158 R
4,406,762 9/1983 Ray et al. ..................... 204/158 HE Primary Examiner—Howard S. Williams
Attorney, Agent, or Firm—Kokjer, Kircher, Bradley, Wharton, Bowman & Johnson

[57] ABSTRACT

A method of removing sulphur from coal prior to burning of the coal is the subject of the present invention. The coal is first comminuted to a size of no more than one inch and preferably one-half inch in diameter. The coal particles are placed in a reaction chamber in an aqueous suspension to which is added an inorganic base capable of reacting with hydrogen sulphide in order to neutralize the latter, such base preferably being calcium hydroxide. A photoelectric catalyst, characterized by structural imperfections to provide active sites for supporting a free radical reaction, is also introduced into the reaction chamber. The coal is then subjected to electromagnetic irradiation of a specific energy level in order to create a free radical reaction which results in removal of the sulphur from the coal. The coal is then cleaned and separated from the aqueous media, and the inorganic base and elemental sulphur are removed from the aqueous media.

7 Claims, 1 Drawing Figure

METHOD OF DESULPHURIZATION OF COAL

Background and Summary of the Invention

This invention relates generally to removal of harmful sulphur compounds from coal and, more particularly, to a method of desulphurization employing a free radical reaction initiated by a source of electromagnetic energy.

Virtually all known coal deposits contain some quantity of sulphur. The amount of sulphur ranges from around $\frac{1}{2}\%$ by weight for anthracite coal to more than 3% by weight for some types of bituminous coal. When coal is burned the sulphur present will be converted to sulphur oxides which are emitted as waste gases. If such gases are allowed to enter the atmosphere harmful acidic compounds are produced. Accordingly, it is the practice in coal burning industries to employ water scrubbers to remove the sulphur oxides. The installation of such equipment is extremely expensive and the problems in handling the resulting sulphur containing sludge are likewise substantial.

Heretofore, however, it has not been practical to remove sulphur from coal prior to burning of the latter. While the composition of coal is of course well established and procedures for breaking down the coal to remove sulphur have been known on a laboratory scale, no procedure adaptable to a commercial scale has heretofore been proposed.

The present invention provides, for the first time a practical means for removing sulphur from coal by utilizing electromagnetic waves to induce a free radical reaction that will separate sulphur from hydrocarbons in the coal.

Objects of the Invention

A primary object of the present invention is to provide a method of removing sulphur from coal prior to burning of the coal.

An important objective of my invention is to provide a method of removing sulphur from coal wherein electromagnetic energy is employed to initiate a free radical reaction that will be self propagating and will terminate in the production of sulphur and sulphur containing compounds that may be easily separated from the remainder of the coal.

A very important aim of the invention is to provide a method of removing sulphur from coal as set forth in the foregoing objects wherein the by-products from the removal process are managable without employing expensive specialized equipment.

It is also an object of this invention to provide a method of removing sulphur from coal which is applicable to different types of coal having varying sulphur contents.

A very important objective of the invention is to provide a method of removing sulphur from coal which is more economical than removing sulphur oxides from the stack gases of coal burning furnaces.

Other objects of the invention will be made clear or become apparent from the following description and claims when read in light of the accompanying drawing wherein:

The FIGURE is a schematic flow diagram illustrating the steps in the method of the present invention.

Detailed Description of the Preferred Embodiment

Figure 1:
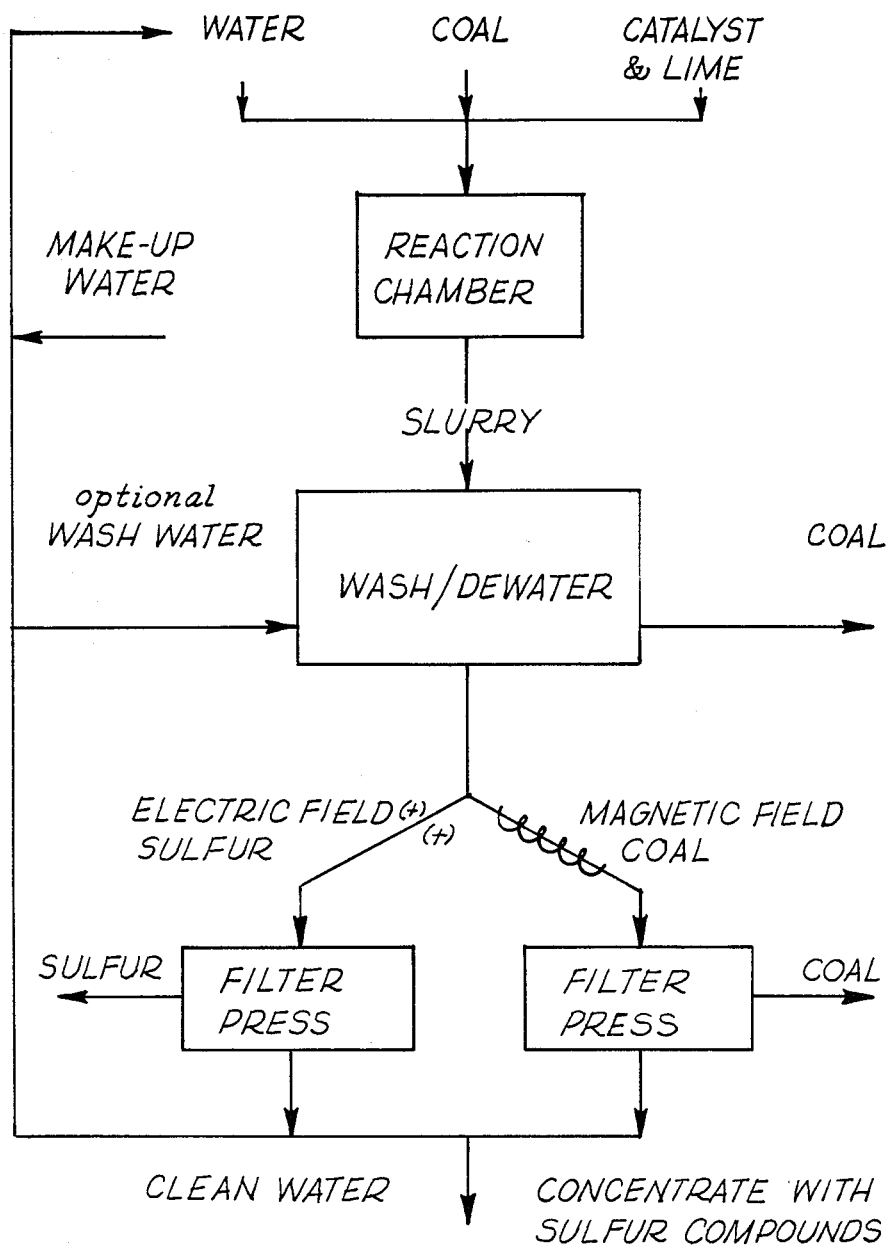

The method of the invention is carried out in a reaction chamber which is preferably a closed vessel having a depth of less than about 10 feet and means such as a plurality of water jets for maintaining the coal in aqueous suspension. The coal is subjected to a comminuting action to reduce its average particle size to no more than approximately one inch in diameter before introduction into the reaction chamber (see drawing). A preferred particle size is about $\frac{1}{2}$ inch in diameter, or small enough to pass through a standard 28 mesh screen.

An inorganic base capable of reacting with hydrogen sulphide to neutralize the latter is added to the aqueous suspension in a quantity to provide a 0.01 to 0.1 molar solution. Calcium hydroxide is the preferred basic substance because it is readily available in coal mining areas although any base which will react with $H_2S$ can be utilized. A suitable substitute for $Ca(OH)_2$ would be $Mg(OH)_2$ or some other Group II Periodic Table metal base.

Also introduced into the reaction chamber in a quantity of about 1 to 10 parts per million (by weight), relative to the quantity of coal present, is a photoelectric catalyst characterized by the presence of active sites. By "photoelectric catalyst" is meant any compound which will generate electricity when subjected to electromagnetic energy. The catalyst compound should also be characterized by structural imperfections which will provide active sites for supporting a free radical reaction. The structural imperfections may be induced by providing known impurities in the catalyst in a quantity of about 1 to 5 parts per million. This is a technique well known to those skilled in the art. The catalyst is selected so that its band gap for energy transfer is approximately equal to or slightly greater than the bond energy which is to be broken.

The preferred catalyst is a combination of indium oxide ($In_2O_3$) and tin oxide ($SnO_2$). Another suitable catalyst is reduced silicon dioxide ($SiO_2$). A combination of the foregoing may also be utilized.

After the catalyst has been added to the aqueous suspension in the reaction chamber, the coal is subjected to a source of electromagnetic radiation. The source is carefully selected so that the energy level of the radiation is slightly greater than the bond energy of the carbon-sulphur bonds in the coal being treated. Generally, an energy level approximately 10% greater than the bond energy is preferred although a greater differential is acceptable.

Sources of electromagnetic radiation which can be utilized in carrying out the method of the present invention include $Co_{57}$ which is a source of gamma radiation at wave lengths of 0.1 to 1.0 A, as well as lasers. A preferred laser will have a wavelength of from 4880 A to 5150 A. In general, the laser should have a wavelength of from 4500 A to 6500 A. For example, suitable laser sources include Helium-Neon, 6328 A; Cadmium-Argon, 4880 A and 5150 A; and Argon ion lasers, 4579 A, 4880 A, and 5145 A. An eighteen watt Cadmium-Argon or Argon ion laser is the preferred source of electromagnetic radiation. The laser should be placed a distance of one to two feet from the aqueous suspension and it has been found that one 18 watt laser positioned at this distance is capable of treating an aqueous suspension of approximately 200 gallons of water per minute to which is added approximately 65 tons of coal per hour. The aqueous suspension of coal particles should be exposed to the electromagnetic radiation for from 30 seconds to 30 minutes. If a radioactive substance producing gamma radiation is utilized, a protective lead container having a window through which the radiation passes is placed in the center of the reaction chamber.

In the reaction vessel (see drawing), the reactions set forth below will be initiated by the electromagnetic energy acting through the catalyst as previously described. It is, of course, known that sulphur is present in coal largely in the form of thio ethers, mercaptans, and other carbon sulphur compounds. Accordingly, in the following reactions, R represents any alkyl group, but primarily $C_8$ or lower alkyls.

I. Initiation

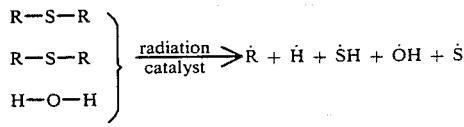

II. Propagation

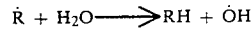

III. Termination

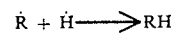

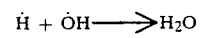

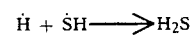

As indicated above, the major products of the free radical reaction are coal (RH hydrocarbons where R is primarily alkyls), sulphur, $H_2S$ and $H_2O$. The $H_2S$ will react with the calcium hydroxide or other base present in the aqueous media according to the following reaction:

The reaction products are transferred to a washing station (see drawing) wherein the coal is cleaned and separated from the aqueous media. The agneous media is then transferred to a magnetic and electrostatic separator to separate fine coal and colloidal sulfur. The coal and sulfur slurries are then subjected to filter pressing to remove both coal and sulphur. The $Ca(HS)_2$ is concentrated and caked out, and the water is recycled.

Analysis has shown that when the method of the invention is followed, over 92% of the total sulphur content of coal may be removed. The technique is more efficient and offers considerable savings over techniques for removing sulphur oxide gases from burned coal.

I claim:

1. A method of coal desulphurization comprising:
preparing an aqueous suspension of said coal, said suspension including an inorganic basic substance and said coal being present in particle sizes of no greater than about one inch in average diameter;
providing a photoelectric catalyst in said suspension characterized by structural imperfections thereby being capable of supporting a free radical reaction;
subjecting said coal particles to electromagnetic waves having an energy level greater than the carbon-sulfur bond energy in said coal thereby initiating a free radical reaction of said sulfur; and
separating the components of said reaction.

2. A method as set forth in claim 1, wherein said step of subjecting said particles to electromagnetic waves comprises exposing same to a laser beam characterized by an output of between about 4500 Å and 6500 Å.

3. A method as set forth in claim 2, wherein said catalyst comprises indium oxide and tin oxide.

4. A method as set forth in claim 2, wherein said catalyst comprises reduced silicon dioxide.

5. A method as set forth in claim 2, wherein said exposing step is continued for from 30 seconds to 30 minutes.

6. A method of coal desulphurization comprising:
preparing an aqueous suspension of coal particles having an average particle size of about one inch in diameter;
adding a quantity of an inorganic base to said suspension to provide a basic solution of from 0.01 to 0.1 molar strength;
providing a photoelectric catalyst in said suspension, said catalyst being characterized by structural imperfections thereby being capable of supporting a free radical reaction, said catalyst being present in a quantity of at least about 1 to 10 parts per million, by weight based on the weight of said coal;
subjecting said suspension to a laser beam having a wave length of from 4880 Å to 5150 Å, for a period of at least about 30 seconds, thereby initiating a free radical reaction of said sulfur; and
separating the components of said reaction.

7. A method as set forth in claim 6, wherein said step of providing a catalyst comprises selecting a catalyst from the group consisting of $SiO_2$ and a combination of $In_2O_3$ and $SnO_2$.

* * * * *